June 23, 1970    K. MacCLURE BAIRD ET AL    3,517,331
METHOD AED APPARATUS FOR THE STABILIZATION OF
LASERS, ETALONS, AND SIMILAR OPTICAL DEVICES
Filed Nov. 16, 1966

INVENTORS
KENNETH M. BAIRD
DONALD S. SMITH
BY
AGENT

United States Patent Office 3,517,331
Patented June 23, 1970

---

3,517,331
METHOD AND APPARATUS FOR THE STABILIZATION OF LASERS, ETALONS, AND SIMILAR OPTICAL DEVICES
Kenneth MacClure Baird, Ottawa, Ontario, and Donald Sinclair Smith, Cumberland, Ontario, Canada, assignors to Canadian Patents and Development Limited, Ottawa, Ontario, Canada, a Canadian company
Filed Nov. 16, 1966, Ser. No. 594,908
Int. Cl. H01s *3/05*
U.S. Cl. 331—94.5          5 Claims

ABSTRACT OF THE DISCLOSURE

A stabilization system for lasers, etalons, and other optical devices of the type having end mirrors mounted on the ends of a sealed chamber wherein the chamber is positioned inside a closed container containing a liquid having a bulk temperature coefficient larger than that of the container and spring means having a stiffness chosen such that changes in the chamber dimensions and thus the spacing of the end mirrors are controlled by the changes in pressure caused by the thermal expansion of the liquid working against the spring means.

---

Figure 1:
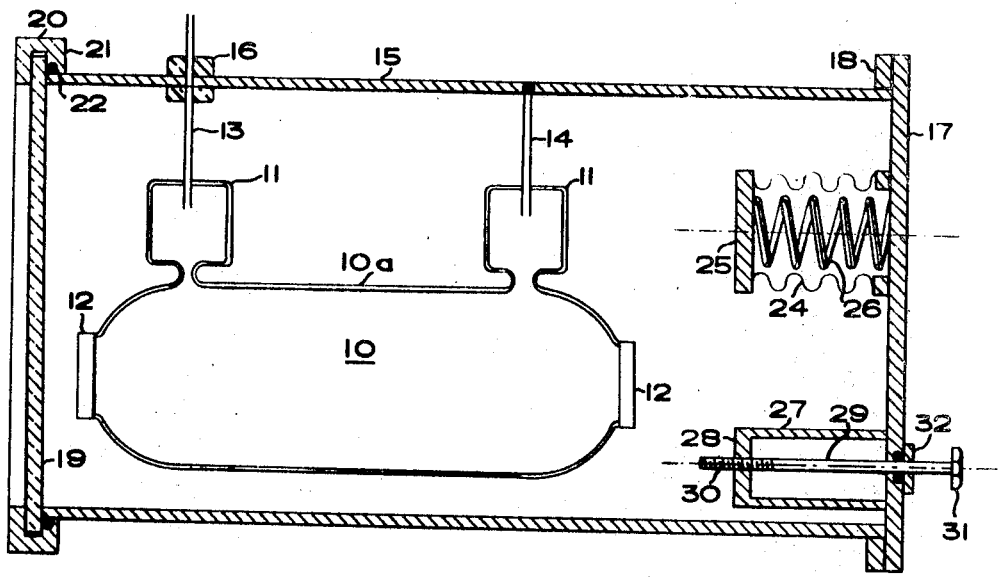

This invention relates to a stabilization device and more particularly to a method and apparatus for the maintaining in very precise dimensional relationship of elements in lasers, etalons, standard measuring elements and other similar devices.

The actual wavelength of the light emitted by a laser depends, within the bandwidth of the relevant spectral line, directly on the optical path length between the reflectors or mirrors. For effective operation, the wavelength of a laser must be maintained and stabilized to a high degree of precision, i.e. to $1:10^6$ or better. This means that the dimensions of the physical structure or spacing means between the mirrors must be precisely maintained. As thermal expansion affects this spacing most directly, it can be said that the emitted wavelength of the laser is directly dependent on the temperature of the spacing structure.

Until now one method of stabilization has been to immerse the laser in a temperature controlled chamber. This method requires a temperature sensing device with attendant electronic circuitry with feed-back loops for controlling the temperature. This system in addition to the complexity involved in the electronics suffers from certain disadvantages. The surrounding medium must be stirred otherwise it is found that the contact between the thermostat and the average laser temperature is poor and the control is either insensitive or is subject to instability resulting in excessive over-correction to small perturbations. If the medium is stirred, the vibration and buffeting experienced by the mirror spacing structure result in considerable "noise" in the laser output.

In another method of control, the output wavelength may be compared with some standard such as the profile of the spectral line which is lasing, or the position of an inflection (known as the Lamb dip) in that profile. These methods are very expensive, complex, and give a degree of stabilization beyond that required for most applications, e.g. the use of a laser beam in metrology. Such apparatus is available at present but is bulky and requires for operation a fair amount of electrical power in addition to that used by the laser itself.

It is an object of the invention to provide a simple, rugged method of stabilization of devices such as lasers, etalons, measuring standards, etc. whose efficient function is dependent on precise control of the spacing of physical elements in the device.

It is another object of the invention to provide a stabilization method and apparatus that does not require complex electronic circuitry and servo feed-back loops.

It is another object of the invention to provide a stabilization system for lasers and the like that once designed and set up requires little or no adjustment or maintenance.

It is another and more specific object of the invention to provide a stabilization system for lasers that will stabilize the frequency of output to a degree suitable for most laser applications, i.e. to the order of $1:10^7$ or better.

These and other objects of the invention are achieved by providing a stabilization system wherein the apparatus is mounted in a closed container containing a liquid having a bulk temperature coefficient larger than that of the container and incorporating compressible spring means in the system, said spring means having a stiffness chosen such that changes in the spacing of elements in the device to be stabilized are controlled by the changes in pressure caused by the thermal expansion of the liquid working against the spring means. For most applications, it will be desired to inhibit almost completely any changes in spacing of the two elements and spring means having the appropriate stiffness can be selected to achieve this.

Figure 2:
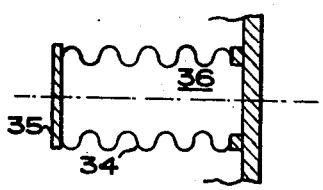
Figure 3:
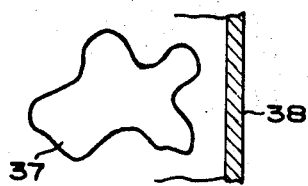

In drawings which illustrate an embodiment of the invention:

FIG. 1 shows a cross-section of a laser mounted in a stabilization system according to the invention, FIG. 2 shows an alternative spring means, and FIG. 3 shows a further form of spring means.

Referring to FIG. 1, a laser 10 which in this case is a neon-helium gas laser of the type having the mirrors or reflectors mounted internally of a quartz envelope is mounted inside a cylindrical chamber or container 15. This type of laser is now in widespread use and little need be said here in regard to its theory of operation except that the physical alignment and spacing of the end mirrors is critical. The alignment is taken care of in the construction of the laser but the spacing which is affected by thermal effects must be compensated for during operation of the laser.

Laser 10 incorporates two enlarged bulb-like portions 11 which accommodate the energization electrodes. The laser is held in position inside container 15 by means of rods 13 and 14 which also act as electrical connections. Rod 14 is connected directly to container 15 by means of insulating seal 16 and would be connected to a suitable power source for the laser. Container 15 could be made of any suitable metal such as copper, aluminum, but it has been found convenient and preferable to make it of Invar because of this alloy's low thermal expansion characteristics. Container 15 is closed at one end by means of end plate 17 attached to end ring 18 by a suitable means and at the other by glass or quartz plate 19 fixed by means of retaining ring 20 suitably attached to end ring 21 with O-ring 22 providing a seal.

On the inner surface of end plate 17 is attached a bellows 24 having an end plate 25 and containing a specially selected spring 26. A cylindrical housing 27 has a rod 29 threaded at 30 passing through the outer end. The rod passes through end plate 17 to the exterior and terminates in a suitable head 31. A shaft seal 32 is provided to prevent leakage of liquid 23 which completely fills the interior of the container.

Any suitable liquid might be used to fill the device but a light, clean insulating oil has been found preferable as it simplifies the insulation problems involved with the power leads. Bellows 24 and its end plate 25 should be sealed such that liquid 23 cannot penetrate into its interior.

In operation, the laser operates in its normal fashion with its output light passing through glass or quartz plate 19. The laser, however, operates at an elevated temperature and the envelope 10a or any other structure that might be used to position mirrors 12 becomes heated and expands with the result that the spacing between the mirrors, which is critical, changes. The device is most sensitive to factors that disturb or alter the temperature which in turn affects the spacing. The temperature changes that cause these changes also affect the surrounding oil medium and this medium has a bulk temperature coefficient greater than that of the container 15. On an increase in temperature, for example, the oil expands against the spring-loaded bellows resulting in compression of the spring. The resulting pressure increase is transferred back via the oil to the laser envelope or support structure and acts to shorten the distance between the laser reflectors. On a temperature decrease the reverse action takes place. It will be seen that by proper choice of spring stiffness it is possible to almost completely compensate for temperature fluctuations and maintain the operating wavelength of the laser well within acceptable limits.

By adjustment of rod 29 which is arranged to alter the space inside the container, the pressure may be changed to bring the operating wavelength of the laser to a nominal value. This device in effect acts as a tuner for the laser.

Other forms of spring means may be used in the device. FIG. 2 shows a sealed bellows 34 with end plate 35. The central area would be filled with air which provides pneumatic spring action. FIG. 3 shows another version where the spring action is provided by a lum or ball 37 of yieldable material such as rubber placed inside the container a portion of the wall of which is shown as 38.

In an early test model of the apparatus according to the invention, a temperature coefficient of wavelength of about 5% of the uncompensated effect has been attained. For many applications of the laser, e.g. measurement applications in metrology, the required stabilization is no more than $1:10^7$. It is possible to achieve this degree of stability or better according to the invention with apparatus that is easily portable, easy to maintain, and involves no additional power requirement.

The above discussion is concerned with the invention as applied to a laser. The invention also has application to other optical devices wherein there is a need for stabilization of the dimensional spacing of mirrors, surfaces and points. The invention has been successsfully applied to a Fabry-Perot etalon which is a device for studying the structure of spectral lines. Other applications of the invention will readily suggest themselves to those knowledgeable in the optics and metrology fields.

The choice of the spring means having the appropriate stiffness characteristics for any specific application might be carried out by theoretical means but applicants have found that empirical methods are fairly simple and straightforward. The output function of the device to be stabilized would be compared to a device of known stability. Spring means of various stiffness ratings would be tried in the stabilization system until the one that gives the required stability is obtained.

Although the device would be used chiefly in those applications requiring almost complete inhibition of change of spacing of the elements (mirrors, etc.), there are possible applications where controlled change would be useful. Spring means could be chosen to achieve the required control and this could be in a positive or negative sense. For example, a useful system might be arranged such that a change in temperature of the apparatus caused by external conditions would result in a change in output function and this could be arranged to work in the negative as well as in the positive sense.

What is claimed is:

1. Apparatus for the stabilization of lasers, etalons, and similar devices whose effective operation depends on the dimensional stability of the distance between two optical elements comprising:
   (a) a sealed chamber having the said two optical elements supported and positioned in spaced relation on opposing ends thereof, said chamber being constructed such that any pressure differential developed between the inner and outer walls thereof will result in a change in the distance between the two elements,
   (b) a closed container inside of which the sealed chamber is mounted,
   (c) compressible spring means positioned inside said container,
   (d) liquid filling the intervening space inside said container and under pressure such as to tend to compress the said spring means, said liquid having a bulk coefficient of thermal expansion greater than that of the closed container, and
   (e) said spring means having a stiffness characteristic such that changes in the spacing between the said two elements is controlled in a predetermined manner by the changes in pressure on the outer walls of sealed chamber caused by the thermal expansion or contraction of the liquid working against the said spring means.

2. Apparatus for the stabilization of lasers, etalons, and similar devices as in claim 1 wherein the spring means is a spring inside a sealed bellows.

3. Apparatus for the stabilization of lasers, etalons, and similar devices as in claim 1 wherein the spring means is a pneumatic spring formed by air trapped inside a sealed collapsible container.

4. Apparatus for the stabilization of lasers, etalons, and similar devices as in claim 1 wherein the spring means comprises a body of yieldable but springy material.

5. Apparatus fo rthe stabilization of lasers, etalons, and similar devices as in claim 1 further comprising a pressure adjusting device in the form of a piston-like rod inserted in the container wall and adapted to change the effective volume inside the container.

References Cited

UNITED STATES PATENTS 3,225,307    12/1965    Weissman.

RONALD L. WIBERT, Primary Examiner

W. L. SIKES, Assistant Examiner

U.S. Cl. X.R.

356—106